INVENTOR:
GÉRARD MELCHIOR
BY Kurt Kelman
Agent

Oct. 7, 1969 G. MELCHIOR 3,471,635

SEQUENTIAL-SIMULTANEOUS COLOUR TELEVISION SYSTEM
USING A FREQUENCY MODULATED SUBCARRIER

Filed July 26, 1966 2 Sheets-Sheet 2

INVENTOR:
GÉRARD MELCHIOR
BY Kurt Kelman
Agent

United States Patent Office 3,471,635
Patented Oct. 7, 1969

3,471,635

SEQUENTIAL-SIMULTANEOUS COLOUR TELEVISION SYSTEM USING A FREQUENCY MODULATED SUBCARRIER

Gerard Melchior, Asnieres, France, assignor to Compagnie Francaise de Television, a corporation of France Filed July 26, 1966, Ser. No. 567,986
Claims priority, application France, July 30, 1965, 26,707
Int. Cl. H04n *1/46, 9/02, 5/38*
U.S. Cl. 178—5.2 5 Claims

ABSTRACT OF THE DISCLOSURE

In a sequential-simultaneous colour television system using a frequency modulated subcarrier for an alternate transmission of two chrominance signals, the subcarrier is submitted to high-frequency pre-emphasis in a coding filter presenting maximum attenuation for a frequency $F_c$ located near the center of the subcarrier frequency band. Improved noise protection for certain colors particularly sensitive to noise, is obtained by using two different resting frequencies, $F_o$ and $F_o'$, for the subcarrier, both different from $F_c$ and located on either side thereof.

The present invention relates to improvements to the sequential-simultaneous colour television system with memory, using a frequency-modulated subcarrier for the alternate transmission of two chrominance signals, such as the "SECAM" system. More particularly, it relates to protecting the colour information against noise.

In a system of the "SECAM"-type using a frequency modulated subcarrier, before its addition to the luminance signal the subcarrier is filtered in a so called coding filter having a maximum attenuation at frequency $F_c$ located near the center of the subcarrier frequency band, and whose gain increases on both sides of this frequency. In systems according to prior art, this frequency $F_c$ coincides with the resting or center frequency of the subcarrier corresponding to a zero amplitude modulating (chrominance) signal.

This filtering by the coding filter, also referred to as high-frequency pre-emphasis, provides on the one hand improved campatibility of this system for black-and-white (monochromatic) reception and, on the other hand, in conjunction with the so called decoding filter, whose characteristic is the inverse of that of the coding filter, provides increased protection of the subcarrier against noise.

The noise reduction obtained by using the coding and decoding filters for the transmission of a frequency modulated signal is not uniform throughout the frequency band occupied by this signal. As some colours (for instance, red) are more sensitive to noise than others, the object of the present invention is to provide better overall performance by giving the colours most vulnerable to noise interference an increased protection with respect to other colours less sensitive to noise. In the "SECAM" system using a frequency modulated subcarrier, each colour is represented by a particular frequency shift relative to the center (resting) frequency. It is therefore possible to obtain better noise protection for certain colours by shifting the resting frequency with respect to $F_c$, which also means the shifting of the frequency representing a particular colour relative to $F_c$.

For example, experience has shown, that it is possible to obtain a better protection against noise for the red colour by positioning the resting frequency of the subcarrier away from $F_c$ toward the frequency corresponding to the maximum algebraical value of the difference signal $(R-Y)$.

In the preferred embodiment of the "SECAM" system, the alternately transmitted colour signals, $A_1$ and $A_2$, are respectively of the form $(R-Y)/K_1$ and $(B-Y)/K_2$, where $R-Y$ and $B-Y$ are the well known difference signals obtained from the basic colours red R, blue B, green G, and the luminance signal Y, and $K_1$ and $K_2$ two constants with opposite signs. It is therefore possible to obtain increased noise protection for both the red and the blue colours by using two different resting frequencies, $F_o$ and $F'_o$ respectively, located on both sides of $F_c$ for the respective transmission of the two signals $A_1$ and $A_2$.

According to the invention, there is provided a colour television system comprising a transmitter and at least one receiver, in which the composite video signal comprises a luminance signal and a colour subcarrier. The transmitter includes a colour channel comprising means for generating two colour signals $A_1$ and $A_2$, means for pre-emphasizing said two colour signals, and means for alternately frequency modulating the subcarrier by the two pre-emphasized signals $A_1$ and $A_2$ where the alternating occurs at the line frequency. The modulated subcarrier is filtered in a coding filter whose gain increases on either side of a frequency $F_c$ through the variation range of the instantaneous frequency of the frequency-modulated subcarrier. The receiver including a colour channel fed by the modulated subcarrier comprises a decoding filter which compensates for the frequency selective action of the coding filter. The modulated subcarrier is fed to a direct channel and a delay channel in parallel, where the delay channel holds the signal propagating therethrough by one line period. The receiver also includes switching means having a first and a second output and whose inputs are respectively fed by the direct and the delay channels, said switching means directing the subcarrier to the first or to the second output according to whether it is modulated by $A_1$ or by $A_2$. Two frequency discriminators respectively receive the outputs of the switching means. To obtain better noise protection for colours particularly vulnerable to noise interference, the transmitter further comprises means for fixing the resting frequency of said subcarrier for the transmission of signal $A_1$ to a value $F_o$ and for the transmission of signal $A_2$ to a value $F'_o$ where both frequencies $F_o$ and $F'_o$ differ from the frequency $F_c$. Each of the discriminators of the receiver are also respectively centered on the frequencies $F_o$ and $F'_o$.

It will be recalled here that in the prior art the resting frequency of the subcarrier is its instantaneous frequency for the zero value of the pre-emphasized signal $A_i$($i$=1 or 2), and that the correct rendition of achromatic (i.e. white or gray) parts of the transmitted picture, which is particularly important for the viewer practically requires that the frequency demodulaters should be centered on the resting frequency, as their "zero" values are more easily precisely adjusted than any other critical value.

However, the advantages accruing from the use of two different resting frequencies for $A_1$ and $A_2$ are not obtained at the expense of more complicated receivers since the usual embodiment of the receivers of the system to which the invention is applied already comprises two different demodulators for supplying respectively signals $A_1$ and $A_2$.

The invention will be further explained, and other features will become apparent, from the following description, with reference to the accompanying drawings, in which.

Figure 1:
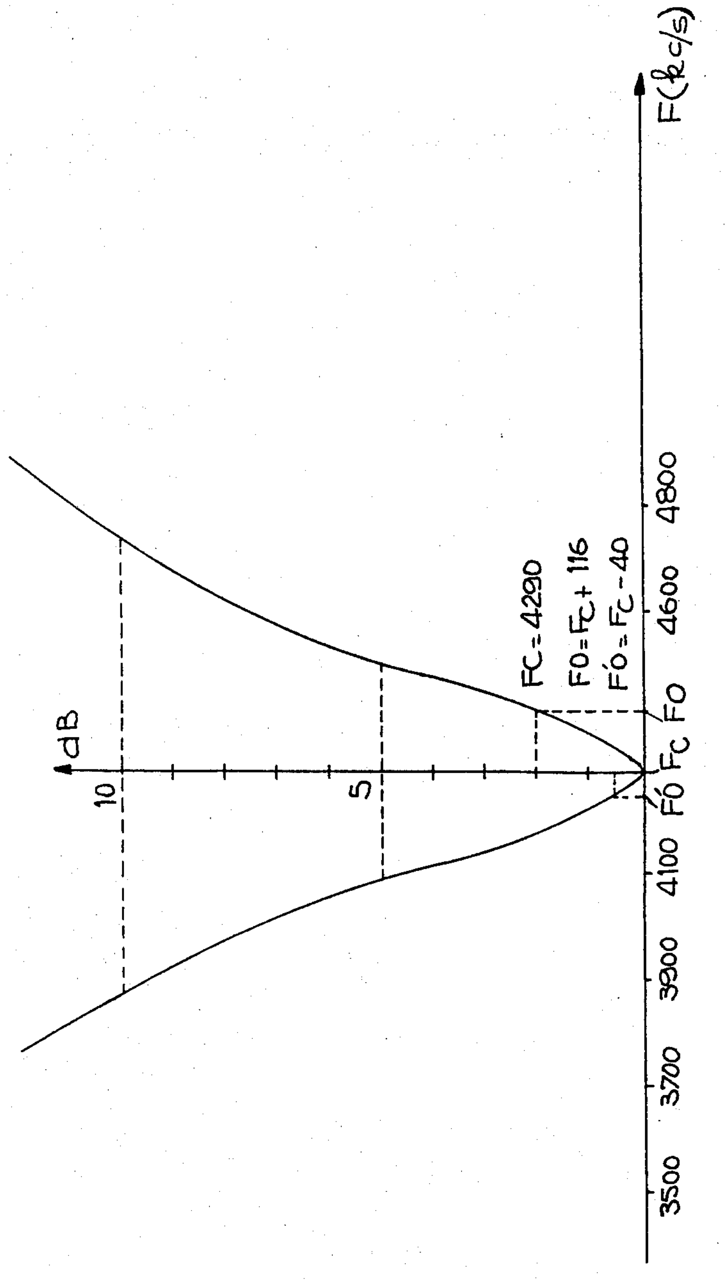
FIG. 1 shows the relative position of frequency $F_c$ and of the two resting frequencies of the subcarrier according to one embodiment of the invention.

There will now be described in a detailed manner, by way of a non-limiting example, the improvement according to the invention as applied to a transmitter-receiver system defined as follows:

The subcarrier channel extends from 3.5 to 4.8 mc./s.

The chrominance signals are $A_1=(R-Y)/K_1$ and $A_2=(B-Y)/K_2$.

The luminance signal Y has the form $$Y=0.59G+0.30R+0.11B$$

R, B and G are the primary colour signals, gammacorrected, varying between 0 and 1.

The maximum algebraical value of $R-Y$ occurs when R=1, B=0, and G=0.

$R-Y$ and $B-Y$ vary therefore, theoretically, between −0.7 and +0.7 and between −0.89 and +0.89, respectively. However, in practice, these signals do not exceed ¾ of their theoretical maximum absolute values, and vary therefore between −0.525 and +0.525, and between −0.67 and +0.67 respectively.

Accordingly, the absolute values of $K_1$ and $K_2$ are taken equal to 0.525 and 0.67 respectively, which gives the same range of variation to the two signals $A_1$ and $A_2$.

More precisely, the signals $A_1$ and $A_2$, obtained at the outputs of a matrix receiving at its three inputs the three gamma corrected primary colour signals, are subjected to a filtering in reducing their bandwidth to 1.5 mc./s. for example, and are then applied to two pre-emphasis filters whose gain increases with frequency.

This pre-emphasis, as is well known, causes substantial amplitude peaks (both positive and negative ones) in steep transitions of the video signals, Consequently, the pre-emphasized signals are subjected to both peak and base clipping in slicers. The clipping is kept sufficiently moderate to prevent introduction of substantial distortion of the signals restored in the receivers, since this operation, contrary to the pre-emphasis, is not compensated for in the receivers.

The output signals from the slicers are applied to the first inputs of two adders whose second inputs respectively receive during two so-called identification signals $a_1=pa$ and $a_2=qa$, signal "$a$" having a single polarity and $p$ and $q$ being two constants of opposite signs. As signal "$a$," each of the two signals $a_1$ and $a_2$ . . . , like signal "$a$," is repeated from one line to the next within each checking period which occurs during a part of each vertical blanking interval. These identification or "checking" signals are used to determine the correct phase of the switch in a "SECAM"-tpye receiver and their absence is used to activate the colour killer in such a receiver as was described in detail in prior U.S. Patent No. 3,267,208, "Color Identification and Associated Apparatus in Sequential Color Television Systems" patented Aug. 16, 1966, by D. Brouard.

The outputs of these adders are connected to the two signal inputs of an electronic switch with a single output, changing its state during each horizontal blanking interval under the influence of a signal applied to its control input.

The switch supplies therefore at its output alternately the signals $A_1$ and $A_2$ during the active field periods, and alternately the signals $a_1$ and $a_2$ during the checking periods.

This output signal of the switch is used for frequently-modulating the subcarrier.

In order to minimize the visibility of spurious patterns due to the presence of the subcarrier in the upper portion of the spectrum of the luminance signal, the frequency modulation is effected in such a way that the subcarrier has the same phase at the beginning of each active line duration. The subcarrier is subsequently submitted to a series of discrete phase-shifts. For example, at least while picture signals are being transmitted, its phase is shifted by 180 degrees for the duration of one line out of three successive ones, and moreover by a further 180 degrees for the duration of one field out of two successive ones.

These phase-shifts i.e., 180 degrees for alternate fields in addition to 180 degrees every third line, with a 625 line picture and interlaced scanning, insure at the beginning of lines of the picture in the vicinity of one another, and corresponding to the transmission of the same colour signal $A_i$ ($i$=1 or 2), phase opposition of the subcarrier, leading to a satisfactory reduction of visibility of the spurious patterns.

The above-mentioned system uses in the transmitter, as part of a device for protecting the chrominance signals against noise, a so-called coding filter, whose input is the modulated subcarrier is applied and whose gain characteristic rises steeply on either side of a predetermined frequency $F_c$ of the instantaneous frequency variation range of the subcarrier. The frequency $F_c$, in the known art, is equal to the (single) resting frequency of the subcarrier.

The subcarrier is thereafter added to the luminance and the sync signals to form the composite video signal which is then transmitted by the transmitter.

In the receiver, the modulated subcarrier, filtered from the composite video signal, is applied to a so called "decoding filter" compensating for the phase and amplitude distortion imparted by the coding filter. Consequently, the decoding filter has a gain characteristic inverse of that of the coding filter, with a maximum gain for frequency $F_c$.

The signals $A_1$ and $A_2$ are repeated to be made simultaneous and switched to two different channels.

Preferably, the repetition and switching occur at subcarrier frequency, and signals $A_1$ and $A_2$ are then obtained by means of two frequency demodulators, and de-emphasized afterwards.

As has been shown in the applicant's prior U.S. Patent No. 3,365,541, the combining of pre-emphasis-de-emphasis with coding-decoding provides the following results:

(a) The pre-emphasis ratio remains sufficiently moderate to avoid excessive increase of subcarrier bandwidth;

(b) The presence of the subcarrier in the luminance signal does not perceptibly deteriorate the picture quality, particularly in black-and-white television receivers; and (c) The protection of chrominance information against noise is generally satisfactory.

The applicant has found that, in a general way, it was advantageous to position the minimum of the characteristic of the coding filter, and consequently the maximum of the characteristic of the decoding filter away from the resting frequency of the subcarrier, towards the instantaneous frequency corresponding, to the chrominance signal having the higher absolute value for the maximum value of $R-Y$ the preemphasis peaks which do not occur in zones of uniform colour are here disregarded.

With the two chrominance signals $A_1$ and $A_2$ more particularly considered in this example, i.e. $A_1=(R-Y)/K_1$ and $A_2=(B-Y)/K_2$, this means that the shift of $F_c$ should be toward the lower or higher frequencies according to whether $K_1$ is negative or positive. The slope of the frequency-modulation characteristic (frequency vs. voltage) being here and hereafter assumed to be positive.

The advantage of this step may be explained as follows:

The chrominance channel noise suppressing process is made up of the "preemphasis-coding" processes in the transmitter, and the "decoding-deëmphasis" processes in the receiver as explained in Patent No. 3,365,541. By "coding" and "decoding" are meant the passing of the modulated subcarrier through the coding and the decoding filters respectively.

As concerns the useful signal, the deemphasis compensates for the preemphasis, and the decoding compensates for the coding.

However, one obtains a reduction of the noise introduced during the transmission, due to the two "windows" formed in the noise spectrum by the decoding filter and by the deemphasis filter.

However, the protection against noise is not uniform for the different colours.

Actually, disregarding the action of the filters, the noise energy density is statistically uniform at subcarrier frequency.

However, as results from a well-known property of frequency modulation, this uniform noise energy spectrum is transformed into a parabolic distribution of noise energy in the demodulated signal, wherein the noise energy density rises proportionally to the square of frequency.

The deemphasis filter, whose gain decreases with increasing frequency, counteracts this increase of noise at higher video frequencies. Nevertheless, in the application under review, this compensation cannot be achieved in as large a measure as would be desirable, as this would require an excessively high preemphasis rate and in consequence an inadmissible widening of the bandwidth of the subcarrier channel.

But, to the action of the deemphasis filter is added that of the decoding filter which reduces the noise at the subcarrier frequency and thus, indirectly, at video frequency.

Theoretical considerations show that, as concerns the reduction of noise at video-frequency, the action of a decoding filter, with a characteristic G(F), of the power gain G as a function of the frequency F, may be practically assimilated, for an instantaneous frequency $F_i$ of the subcarrier, to that of a video frequency filter with the characteristic $g_i(f)$ for the power gain $g_i$ as a function of the frequency $f$, with $$g_i(f)=\frac{G(F_i+f)+G(F_i-f)}{2}$$

The action of the decoding filter is thus dependent on the instantaneous frequency, consequently on the instantaneous value of the transmitted chrominance signals, and finally on the colour to be reproduced. By positioning the maximum of the characteristic of the decoding filter and consequently the minimum of the characteristic of the coding filter as indicated previously, it is possible to provide better noise protection for certain colours, which are chosen from those most vulnerable to noise interference, at the price of accepting lesser protection for other colours, which are less sensitive to noise.

In a general way, the action of the decoding filter remains satisfactory as long as the interval between the filter center frequency $F_c$ and the instantaneous frequency $F_i$ is not too wide. The above-mentioned positioning of $F_c$ away from the resting frequency towards the instantaneous frequency corresponding to the transmission of the maximum algebraical value of $R-Y$, allows a big improvement of the protection against noise of highly saturated red portions of the picture, where noise is particularly disturbing to the observer, for different reasons either objective or subjective.

The precise position of $F_c$ with respect to the resting frequency to be adopted, taking into account the distribution of noise at video frequency, the action of the deemphasis filter, and the effects of the shift for other colours, may be adjusted experimentally to obtain a satisfactory overall result.

The applicant has found in particular that if $K_2$ is chosen with the same sign as $K_1$, not only the red, but also the other two colours of the "75 percent standard bar pattern," which have the lowest brightness and for which the eye of the viewer is therefore particularly sensitive to noise are favoured by the above-mentioned measure.

However, by taking for $K_1$ and $K_2$ the same sign, the visibility of errors in the chrominance signals resulting from the addition of the subcarrier to the luminance signal is increased.

Assuming, in fact, that the luminance signal Y is repeated at least approximately, which is generally the case, along two picture lines analyzed successively, the errors due to this cross-colour, and especially to the differential phase, will be substantially the same for the signals $A_1$ and $A_2$, relating to these two picture lines.

If $K_1$ and $K_2$ have the same sign, the values of $R-Y$ and $B-Y$ will be affected in the same direction, whilst, if $K_1$ and $K_2$ have opposite signs, the values of $R-Y$ and $B-Y$ are affected in opposite directions.

It can now be shown, by using the colour triangle and taking into consideration the sensitivity of the human eye to chromaticity differences, that the eye will generally be more sensitive to chromaticity errors if the values of $R-Y$ and $B-Y$ are affected by errors in the same direction than if they are affected by errors of opposite signs.

An advantage of the present invention is that it allows the transmission of $R-Y$ and $B-Y$ with coefficients having opposite signs while maintaining in a large measure the advantages accruing from positioning $F_c$ away from the resting frequency simultaneously towards the instantaneous frequency corresponding to the transmission of the maximum algebraical value of $R-Y$ for the transmission of signal $A_1$ and towards the instantaneous frequency corresponding to the transmission of the maximum algebraical value of $B-Y$ for the transmission of signal $A_2$. This is accomplished by keeping the $F_c$ fixed and shifting the resting frequency of the subcarrier for $R-Y$ and for $B-Y$.

Taking into account other considerations which will be set forth hereinafter, a satisfactory embodiment of the present invention for the system considered corresponds to the following data: $K_1$ is negative, and equal to $-0.525$; and $K_2$ is positive, and equal to $+0.67$.

The preemphasis of signals $A_1$ and $A_2$ is effected according to the law:

$$g_p(f)=\frac{1+(f/f_1)^2}{1+(f/kf_1)^2}$$

with $f_1=85$ kc./s., for $f$ in kc./s., $k=3$; $g_p(f)$ being the power gain of the preemphasis filter for frequency $f$.

The power gain $G_c$ of the coding filter for frequency F is:

$$G_c(F)=\frac{1+256\theta^2}{1+1.6\theta^2}$$

with $$\theta=\frac{F}{F_c}-\frac{F_c}{F}$$

These two gains $g_p(f)$ and $G_c(F)$, are power gains in the strict sense of the term, i.e. true ratios and not db.

Experience has shown that optimum overall performance is obtained by choosing $F_o=4.4$ mc./s. and $F'_o=4.25$ mc./s., approximately. As the procedure for reducing the visibility of the subcarrier in the "SECAM" system requires resting frequencies which are entire multiples of the line frequency $F_L$, the resting frequencies of the subcarrier in the preferred embodiment of this system are therefore:

$$F_o=282\cdot F_L$$

$$F'_o=272\cdot F_L$$

This gives, for a 625 line picture and 50 fields per second, i.e. $F_L=15.625$ kc./s. the following values: $F_o=4.40625$ mc./s., and $F'_o=4.250$ mc./s.

The "restricted" frequency swing will be defined as the range of variation of the instantaneous frequency corresponding to the range of variation from $-1$ to $+1$ volt of the preemphasized signal $A_i$ ($i=1$ or 2). This corresponds to the positive maximum and negative minimum of the unpre-emphasized signal, i.e., of the chrominance signal without transients. It will be remarked that this range of variation is the same as that of the signal $A_1$ not pre-emphasized.

The restricted frequency swings were chosen to be: from $F_o-280$ kc./s. to $F_o+280$ kc./s. for signal $A_1$ from $F'_o-230$ kc./s. to $F'_o+230$ kc./s. for signal $A_2$ . . . as will be explained hereinafter.

The "total" frequency swing, i.e. the entire range of variation of the instantaneous frequency, corresponding to the extreme values of the clipped pre-emphasis peaks, is substantially the same for the two signals and extends: from $F_2=3.900$ mc./s. to $F_1=4.756$ mc./s.

As $F_o \cong 4.4$ mc./s. and $F'_o \cong 4.25$ mc./s., it can be seen that $F_1 \cong F_o+350$ kc./s.$\cong F'_o+500$ kc./s.$\cong 4.75$ mc./s. and $F_2 \cong F_o-500$ kc./s.$\cong F'_o-350$ kc./s.$\cong 3.9$ mc./s., i.e. $F_o>F'_o$ and $F_o-F'_o \cong 150$ kc./s., i.e. approximately: from $F_o-500$ to $F_o+350$ kc./s. for signal $A_1$; and from $F'_o-350$ to $F'_o+500$ kc./s. for signal $A_2$.

The excess of the total frequency swing over the restricted frequency swing is only used as concerns $A_1$ and $A_2$ for the transmission of high pre-emphasis peaks and the clipping of each of the two signals $A_1$ and $A_2$ is effected accordingly. $F_c$ is taken equal to 4.290 kc./s.

Of course, this is only a numerical example.

However there will be indicated, to show how the invention may be applied in a general way, the reasons leading to those dissymetrical data.

As will be explained hereinafter, it has been found sufficient to use, for signal $A_1$, an upper sideband of about 400 kc./s. only, as compared with 900 kc./s. for the lower sideband.

It will be first recalled that in frequency modulation, the transmitted spectrum of the modulated wave comprises the frequency swing (variation interval of the instantaneous frequency) bordered generally by two "marginal" bands, forming part, one of the upper sideband and the other of the lower sideband. The marginal bands considered here are those which border the restricted frequency swing.

Thus, the reduction of the upper sideband to 400 kc./s. for the signal $A_1$ takes the following factors into consideration:

(1) From the point of view of compatibility, it is of greater interest to reduce the upper sideband than the lower sideband as this allows for the shifting of the resting frequency toward the higher frequencies and as most of the subcarrier spectral energy is concentrated around the resting frequency, the subcarrier will interfere less with the luminance the higher its frequency.

(2) A sufficiently correct definition of the transmitted signal can be maintained with one of the marginal bands being considerably reduced provided that the other one is sufficiently wide.

(3) In order to ensure a subjectively satisfactory transmission of $R-Y$, it is more important to respect the preemphasis peaks for the values of $A_1$ corresponding to a positive value of $R-Y$ rather than for the values of $A_1$ corresponding to the negative values of $R-Y$. This can easily be seen from the fact that positive pre-emphasis peaks mean abrupt transients toward higher brightness in general, which are much more perceptible than transients toward lower brightness, i.e., darker areas in the picture, which are represented by negative-going pre-emphasis peaks.

As the upper limit of the subcarrier channel is approximately at 4.8 mc./s., the 400 kc./s. width of the upper sideband sets the resting frequency $F_o$ of the subcarrier at about 4.4 mc./s. insofar as the signal $A_1$ is concerned.

Regarding $A_2$, and for reasons outlined above, the sign of $K_2$ is opposite to that of $K_1$, i.e. $K_2$ is positive and equal to $+0.67$. Taking into account this positive sign, it is preferable to make the upper sideband of the modulated subcarrier wider than that of the upper sideband of the subcarrier signal modulated by $A_1$, without, however, it being necessary to make it as wide as that of the lower sideband used for $A_1$, taking into consideration, on the one hand the special importance of the saturated red zones, as already mentioned hereinbefore, and on the other hand the fact that, from the viewpoint of definition, it matters little which of the two marginal bands is reduced relative to the other. One may have, for example, 550 kc./s. for the upper sideband relating to $A_2$, which means, for the resting frequency $F'_o$ a value of the order of 4.250 mc./s.

The restricted frequency swing may have, for $A_2$, the same width as for $A_1$.

It is however preferable to reduce it, for example, to $F'_o \pm 230$ kc./s., since the protection of the signal $A_2$ against noise, still remains satisfactory and this reduction has the additional advantage of compensating in part for the decrease in bandwidth of the wider marginal band retained for $A_2$, compared to the one retained for $A_1$, this decrease being due to the positioning of $F'_o$ with respect to $F_o$.

It will be seen that the description as presented, as hereinabove, may be viewed as the use of two different slopes for the modulation characteristics respectively used for the transmission of signals $A_1$ and $A_2$ having the same range of variation, or as the use of two constants $K_1$ and $K_2$, for signals $A_1$ and $A_2$ such that the ratio $$K_2/K_1=(0.67/0.525)\cdot(280/230)$$

the two signals $A_1$ and $A_2$ having then different variation ranges, but the same slope being maintained for both modulation characteristics.

The minimum of the gain characteristic of the coding filter is located between $F'_o$ and $F_o$, but taking into account the better overall protection to be given to $A_1$ comparatively to $A_2$, the difference of the resting frequencies $F_o$ and $F'_o$ with respect to $F_c$ are not equal, and the minimum is located at a frequency of the order of 4.290 mc./s., i.e. a difference of only 40 kc./s. with respect to $F'_o$, against a difference of about 116 kc./s. with respect to $F_o$.

FIG. 1 shows the centre part of the gain vs. frequency curve of the coding filter, translated into decibels, with indication of the limits of the chrominance channel and of the location of the frequencies $F'_o$ and $F_o$ on the frequency axis. Naturally, the gain curve of the decoding filter is the reverse of that of the coding filter.

Figures 2, 3, 4:
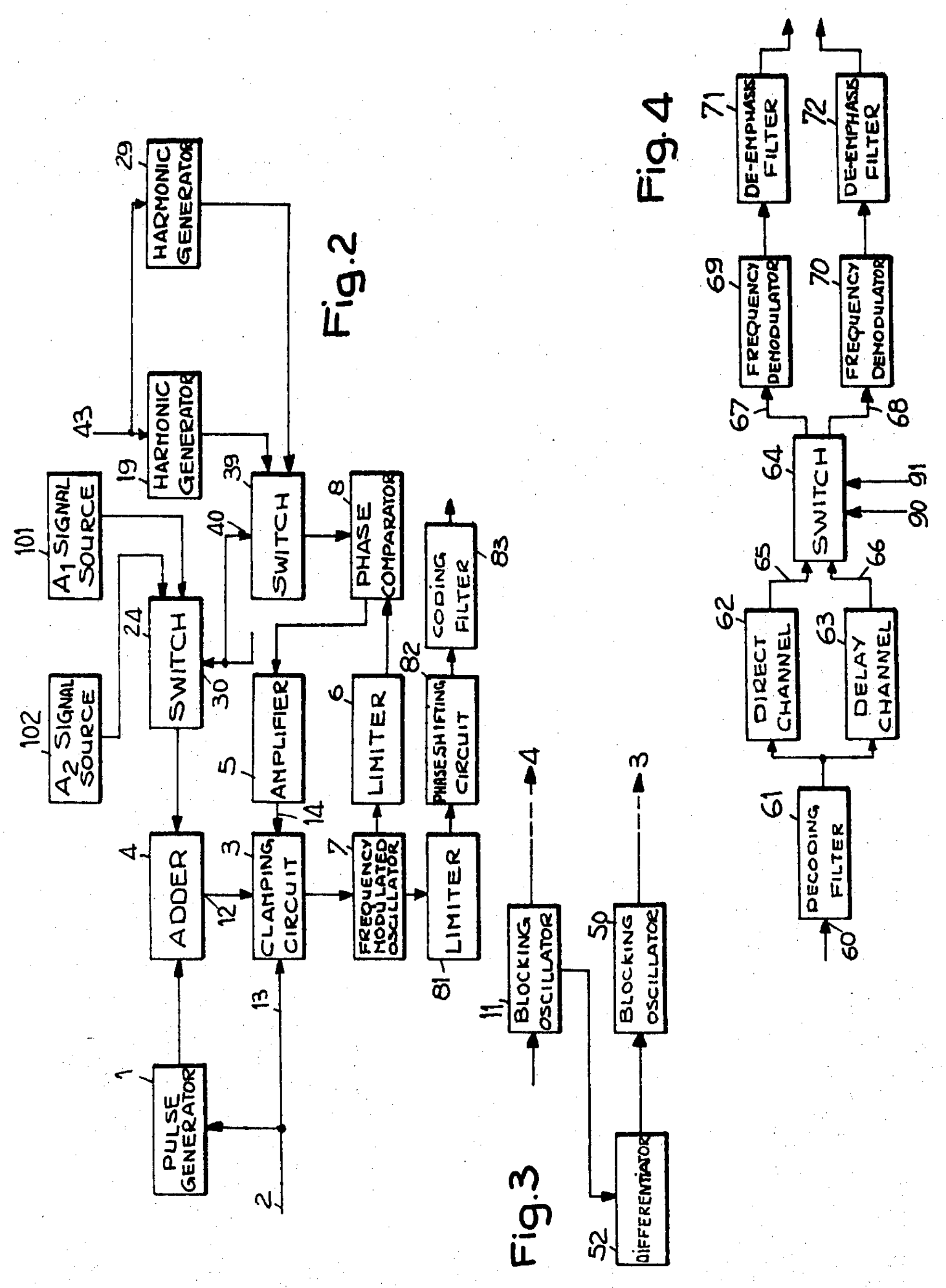
FIG. 2 is the diagram of a preferred circuit for modulating the subcarrier in a transmitter according to the invention.
FIG. 3 shows a modification of the diagram in FIG. 2.
FIG. 4 is a diagram of an embodiment of the subcarrier channel in a receiver according to the invention.

FIG. 2 illustrates a particularly advantageous embodiment of the subcarrier generating circuit, which has the advantage of insuring with a single frequency modulated oscillator, two stable resting frequencies $F_o$ and $F'_o$, and of allowing the use of the same system for subcarrier visibility reduction, which is used in known art with a single subcarrier resting frequency.

The drawing shows the switch 24 having two inputs and one output, and supplying the signal to be transmitted by modulation of the subcarrier.

The two inputs of the switch are connected to the outputs of two circuits 101 and 102 respectively. The former supplies signal $A_1$ during each active field duration i.e. during each time interval comprised between two successive vertical blanking intervals, and signal $a_1$ during the checking periods. The latter supplies signal $A_2$ during each active field duration and signal $a_2$ during the checking periods. In this embodiment, signals $A_1$ and $A_2$ supplied by circuits 101 and 102 are preemphasized and clipped before the switching the ratio of the constants $K_1$ and $K_2$ included in the expression of $A_1$ and $A_2$ respectively are taken such that the same slope of the frequency vs. voltage curve of the modulator may be used. Identification signals $a_1$ and $a_2$ are preferably added to chrominance signals $A_1$ and $A_2$ respectively, after the latter have been preemphasized and clipped. Thus the indentification signal $a_1$ and $a_2$, which respectively have the form of trapezoidal pulses of opposite polarities, are added to the pre-emphasized and clipped chrominance signal during checking periods included in each vertical blanking interval, as described in Patent No. 3,267,208.

The switch 24 changes its state during each horizontal blanking interval, due to the control signal applied to its control input 30.

The output signal of switch 24 presents during each horizontal blanking interval a constant value, the so-called blanking level. This circuit 24 feeds the first input of an adder 4, whose output is connected to the signal input 12 of the clamping circuit 3.

The clamping circuit 3 is a conventional clamping circuit of a type often used in television as a D-C restorer for video signals. It includes a signal input for receiving the video signal, a control input for receiving clamping pulses whose duration coincides approximately with that of the horizontal blanking intervals, and a reference input brought to the reference potential to which the blanking level is to be clamped. These three inputs are, in FIG. 2, inputs 12, 13 and 14 respectively. The control input 13 of the clamping circuit is connected to a general input 2 of the circuit to which the conventional "SECAM"-type clamping pulses are applied.

The output of the clamping circuit 3 is connected to the modulation input of a frequency modulated oscillator 7 of the general type in which the instantaneous frequency is determined by the value of the signal applied to its modulation input.

The output signal of the oscillator 7 is applied, through a limiter 6 if necessary (i.e. if the oscillator 7 supplies a frequency modulated wave affected by a parasitic amplitude modulation), to the first input of a phase comparator 8, whose second input is connected to the output of a switch 39, having two signal inputs connected, respectively, to the outputs of two harmonic generators 19 and 29, supplying two reference waves. The switch 39 has a control input 40, receiving the same control signal as the input 30 of the switch 24.

Each of the two harmonic generators 19 and 29 comprises in series two amplifiers, the load of each amplifier being a crystal resonant circuit having a very high selectively (i.e. Q). The resonant circuits of the generator 19 are tuned to the frequency $F_0=282 \cdot F_L$ and those of the generator 29 to the frequency $F'_0=272 \cdot F_L$. The two generators are shock-excited by pulses J obtained by differentiation of the leading edge of the clamping pulses, and these pulses J are applied to the input 43, connected to the inputs of the generators 19 and 29.

The two generators are therefore synchronized in phase at the start of each clamping pulse, and the phase shift between their two output signals 1 $\mu$s. later, attains only $360° \cdot 10 \cdot F_L \cdot 10^{-6}$ which is less than 60°.

The phase comparator 8 supplies, for example a signal in sin P, where P is the phase difference between its two input signals.

The output of the comparator 8 is connected through an amplifier arrangement 5, which may be of the low-pass type, to the reference input 14 of the clamping circuit 3. This amplifier amplifies the signal supplied by the phase comparator 8 and adds to the amplified signal a D-C voltage $N_0$.

The oscillator 7 feeds, in addition to the limiter 6, another limiter 81, whose output is connected to subsequent subcarrier circuits including the circuits 82 imparting the above mentioned 180° phase-shifts and the coding filter 83.

The circuit comprises finally a pulse generator 1, whose input is connected to the input 2, and whose output is connected to the second input of the adder 4.

The operation of this circuit may be explained as follows:

First, it will be assumed that switch 39 is held permanently in its first state, where it delivers the output signal of the harmonic generator 19. Further, it will be assumed that pulse generator 1 and adder 4 are disconnected from the circuit, the output of switch 24 being directly connected to the signal input of the clamping circuit 3.

The clamping circuit 3 operates as a conventional clamping circuit, except for the nature of the reference potential. There is thus obtained, for the duration of each clamping pulse, a loop 7–6–8–5–3–7 synchronizing in frequency and phase the wave supplied by the oscillator 7 and that which is supplied by the harmonic generator 19, since the equilibrium cannot be reached unless they have the same frequency and a constant phase difference $\varphi_0$ between them.

It follows that: (a) because of the lasting effect, during the following active line duration, of the clamping effected by circuit 3, the resting frequency of oscillator 7, is during this line active duration, effectively set at the frequency $F_0$ of harmonic generator 19, and any drift of oscillator 7 is corrected; (b) at the start of each active line duration, the wave supplied by oscillator 7 has a fixed phase $\phi_0$.

If now switch 39 is maintained in its second state, the process will be the same as that which has been described above, except that the resting frequency of the oscillator 7 will be set at $F'_0$ and that the phase of the wave supplied at the beginning of each active line duration by this oscillator will have a fixed value, $\phi'_0$, generally different from $\phi_0$, $\phi'_0$ depending upon the phase difference $\varphi'_0$ between the phase of the oscillator 7 and that of the generator 29 when equilibrium is reached in the feedback loop.

If switch 39 changes its state in synchronism with switch 24, the desired result will be achieved as concerns the resting frequencies. Besides, the phase of the subcarrier will be the same at the start of each active line duration corresponding to the transmission of $A_1$, and will have also a constant value at the start of each active line duration corresponding to the transmission of $A_2$.

The D-C component $N_0$ added to the amplifier error signal in the amplifier 5 is chosen so as to facilitate the synchronizing. It may, for example, be taken intermediate between the control voltages for the oscillator 7 corresponding nominally to frequencies $F_0$ and $F'_0$ of the latter.

The elements 1 and 4 of this circuit have the object of facilitating this control, because the equilibrium might not be reached during the clamping periods if the initial phase difference P at the start of the closing period of the loop differs too much from that corresponding to the equilibrium state. Especially, if for reasons of accuracy, a phase comparator is used which supplies an output signal of the form sin P, the duration for establishing the equilibrium state becomes very long if the initial phase difference between the wave supplied by oscillator 7 and the reference wave differs by about 180° from the phase difference which corresponds to the equilibrium state. This shows the utility of facilitating the control by acting quickly by other means on the phase of the modulated oscillator so that a favourable phase difference, i.e. not too far from the one which the feedback loop tends to impart is available well before the end of the clamping pulses.

The pulse generator 1 is used for this rapid action. It receives the clamping pulses and supplies blocking pulses.

The generator 1 comprises for example a circuit, differentiating the leading edges of the clamping pulses, which thus delivers a short pulse at the start of each clamping pulse, followed by a blocking oscillator triggered by these short pulses and supplying for each of them a pulse in the form of a trapezium with steep flanks covering only the beginning (about 1 $\mu$s.) of the duration of the clamping pulses.

This pulse is applied to the second input of the adder 4, so that during the corresponding time interval the output signal thereof is the sum of the blanking level and of the blocking pulse.

To each trapezoidal pulse corresponds a blocking, followed by an unblocking of the oscillator 7 which will start to oscillate again and have a substantially constant phase at an instant $t$, separated from the trailing edge of the trapezoidal pulse by a fixed time interval T long enough for the transient state of oscillator 7 i.e. the state before the oscillation becomes subtantially stable, to have come to an end.

The unblocking of the oscillator 7 causes the closing of the feedback loop.

Experience shows that the gain of the feedback loop and the characteristics defining the blocking pulse may be adjusted to insure equilibrium of the feedback loop before the end of the clamping pulses, whether the output signal of generator 19 or of generator 29 is used as reference.

This condition may be obtained in both cases since, on the one hand, as indicated above, the phase difference between the two reference waves is less than 60° 1 $\mu$s. after the beginning of each horizontal blanking interval, and, on the other hand, the difference between $\varphi_0$ and $\varphi'_0$ may be made very small through an adequate gain of the feedback loop.

This device may be further improved by the modification of FIG. 3.

The blocking pulses are directly produced by a blocking oscillator 11 triggered by pulses corresponding to the leading edge of the clamping pulses previously applied to input 2, one output of the generator 11 being connected as previously generator 1 to one input of the adder 4. On the other hand fresh clamping pulses are obtained from a blocking oscillator 50 triggered by the trailing edge of the blocking pulses which are to this end differentiated in a differentiator 52 whose input is connected to the output or the oscillator 11 and whose outuput is connected to the input of the oscillator 50. The pulses J applied to generators 19 and 29 correspond to the leading edge of the fresh clamping pulses.

The output of the oscillator 50 is connected to the first input of the clamping circuit 3.

This arrangement makes it possible to separate the synchronizing and blocking operations better.

Another method for blocking oscillator 7 consists in inserting into the circuits of oscillator 7 a switch, actuated by the blocking pulses, so that for the duration of these pulses, one or more elements, essential to the generation of oscillation, be disconnected or short-circuited. The adder 4 is then obviously eliminated and the output of switch 24 connected directly to input 12 of the clamping circuit.

The complex circuits of FIG. 2 and their modifications have the advantage of perfectly fixing the frequencies $F_0$ and $F'_0$. This result is not obtained so perfectly, if a constant D-C component is simply added to signal $A_2$, only one reference wave at frequency $F_0$ being then used in the circuit of FIG. 2. Besides this would not be satisfactory for the phase synchronizing.

The two methods may however be advantageously combined as follows: the circuits 101 and 102 normally comprise clamping circuits, for clamping signals $A_1$ and $A_2$ before they are clipped, according to known art, when signals $A_1$ and $A_2$ are transmitted according to the same modulation standards. It is thus possible to add to signal $A_2$ during this clamping operation, the desired constant D-C component by modifying the reference voltage used for clamping signal $A_2$ accordingly.

Under those circumstances, the feedback circuit using two reference signals of FIG. 2, in so far as the resting frequencies are concerned, no longer has the task of compensating for a basic gap but only of compensating for inaccuracy errors.

It is also possible to preemphasize, clamp and clip signals $A_1$ and $A_2$ at the output of switch 24. In this case the clamping is alternately effected with two reference potentials, changing from one clamping period to the other; the reference voltage is supplied by the output of a switch having two inputs. Here again the operation of the feedback loop is made easier.

It will be seen that the transmitter which has been described allows the application of the above-mentioned system for reducing subcarrier visibility.

This system is based upon a constant initial phase of the modulated subcarrier supplied by the frequency modulator at the start of each line active duration (corresponding to the transmission of picture signals) and subsequent phase-shifts of 180 degrees, each of which affects a whole number of line periods.

Those phase-shifts have only the object of producing optical compensations between the picture lines corresponding to the transmission of the same chrominance signal, either $A_1$ or $A_2$. Under these conditions it is indifferent if prior to the phase reversals, the subcarrier has not the same initial phase at the start of the active line periods corresponding to the transmission of $A_1$, as at the start of the active line periods corresponding to the transmission of $A_2$, as long as this phase is constant in one case as in the other, which result is obtained with the circuit of FIG. 2, and its variations.

This initial phase may further be made the same for the transmission of both signals ($A_1$ and $A_2$), through slightly delaying, by means of a delay device, the instant at which pulses J are applied to one of the harmonic generators relative to the instant to which they are applied to the other. Experience shows that the synchronizing is facilitated.

FIG. 4 shows the modifications to be applied to the subcarrier channel of receivers, in the example described.

The modulated subcarrier is applied at 60 to the decoding filter 61 whose gain vs. frequency curve compensates for that of the coding filter (FIG. 1). The output of the filter 61 feeds in parallel a direct channel 62 and a delay channel 63, which delays the signals passing therethrough by one line period relative to the signals passing through the direct channel.

The outputs of the direct and delay channels are connected to the two signal inputs 65 and 66 of a switch 64 controlled by means of signals applied to its control inputs 90 and 91, and directing the subcarrier (direct or delayed) respectively to its output 67 when it is modulated by the signal $A_1$, and to its output 68 when it is modulated by the signal $A_2$.

The output 67 feeds a frequency demodulator 69 consisting of a frequency discriminator preceded by an amplitude limiter, and the output 68 a frequency demodulator 70, having the same components.

The frequency discriminator of the demodulator 69 is centred on the frequency $F_0$ and the discriminator of the demodulator 70 on the frequency $F'_0$. Moreover the demodulator 69 is preferably so designed that it supplies the signal $A_1$ with a negative coefficient, while the demodulator 70 supplies the signal $A_2$ with a positive coefficient. The demodulation slopes of the demodulators determined for example, by the thresholds of the preceding limiters, are chosen taking into account the modulation standards for each of the two signals, and the precise signals, proportional to $A_1$ and $A_2$ respectively, which it is preferred to obtain at the outputs of the demodulators.

In particular, the slopes of the demodulators may be chosen to supply the signals $R-Y$ and $B-Y$ directly, instead of $-A_1$ and $A_2$.

The output signals of the demodulators are finally deemphasized in the deemphasis filters 71 and 72, connected to the outputs of the demodulators 69 and 70 respectively.

During the checking periods, the outputs of each demodulator, 69 and 70, and of each deemphasis filter, 71 and 72, respectively provide a signal, which differs according to whether the phase of switch 64 is correct or incorrect. Consequently these signals can be used as in known art, in the switch control circuit. It can be easily seen that it is advantageous to take $a_1$ positive and $a_2$ negative for the example described above.

These identification signals present the twofold advantage ($a$) of their long duration ($b$) of their high magnitude relatively to the colour signals since it is possible to encroach for their transmission, over the excess of the total frequency swing relatively to the restricted frequency swing.

Of course, the invention is not limited to the embodiments shown. In particular, it is possible, although less advantageously, to use two modulated oscillators respectively for the transmission of $A_1$ and $A_2$.

What is claimed is:

1. A colour television system comprising a transmitter and at least one receiver, in which the transmitted composite video signal comprises a luminance signal and a colour subcarrier, said transmitter including a colour channel comprising means for generating two colour signals $A_1$ and $A_2$, means for preemphasizing said two colour signals, means for fixing the resting frequency of said subcarrier to a value $F_o$ and to a value $F'_o$, means for alternately frequency modulating at line frequency said subcarrier resting at frequency $F_o$ by said pre-emphasized signal $A_1$ and said subcarrier resting at frequency $F'_o$ by said pre-emphasized signal $A_2$, a coding filter whose gain increases on either side of a frequency $F_c$ within the variation range of the instantaneous frequency of the frequency-modulated subcarrier, said coding filter being fed by the frequency modulated subcarrier before its addition to the luminance signal, said frequencies $F_o$ and $F'_o$ differing from said frequency $F_c$, said receiver including a colour channel fed by said frequency-modulated subcarrier comprising a decoding filter which compensates for the frequency selective action of the coding filter, a direct channel and a delay channel fed in parallel by the output of said decoding filter, said delay channel delaying the signal propagating therethrough by one line period, switching means having a first and a second output and whose inputs are respectively fed by said direct and delay channels, said switching means directing the subcarrier to said first and to said second output according to whether it is modulated by $A_1$ or $A_2$, and a first and a second frequency discriminator respectively centered on said frequencies F and F' and respectively coupled to said first and second output of said switching means.

2. A colour television system as claimed in claim 1, wherein said colour signals $A_1$ and $A_2$ respectively being of the form $A_1=(R-Y)/K_1$ and $A_2=(B-Y)/K_2$, where $K_1$ is a negative constant, and $K_2$ a positive constant, wherein $F'_o$ is smaller than $F_o$, and both being respectively located on either side of $F_c$.

3. A colour television as in claim 2, wherein said means for fixing the resting frequency comprises a single oscillator having a modulation input and a voltage-controlled frequency characteristic, two voltages differing by a value corresponding to the difference $F_o-F'_o$, and means for applying said two voltages at the same time as signals $A_1$ and $A_2$.

4. A colour television system as claimed in claim 3, where $F_o$ and $F'_o$ are different entire multiples of the line frequency, and where said transmitter comprises a feedback loop with a phase comparator for synchronizing the frequency of said modulated oscillator alternately to the frequency of a reference wave with the frequency $F_o$ and to the frequency of a reference wave with the frequency $F'_o$ during the back porch of the line blanking interval.

5. A colour television receiver for receiving a composite video signal comprising a luminance signal and a colour subcarrier situated within the frequency band of said luminance signal, said colour subcarrier being alternately frequency-modulated by two pre-emphasized chrominance signals $A_1$ and $A_2$, the alternation of $A_1$ and $A_2$ occurring at the line frequency, said colour subcarrier taking on two resting frequencies $F_o$ and $F'_o$ for modulation by $A_1$ and $A_2$ respectively, said resting frequencies $F_o$ and $F'_o$ being situated on either side of a frequency $F_c$ representing the maximum attenuation of a coding filter to which the modulated subcarrier is submitted before being added to said luminance signal, said coding filter constituting a part of a noise protection device for the colour subcarrier, said receiver comprising a colour channel fed by said subcarrier, said colour channel comprising a decoding filter which compensates for the frequency selective action of the coding filter, a direct channel and a delay channel fed in parallel by the output of said decoding filter, said delay channel delaying the signal propagating therethrough by one line period, switching means whose inputs are respectively fed by said direct and delay channels and having a first and a second output, said switching means directing the subcarrier to said first and said second output according to whether it is modulated by $A_1$ or by $A_2$, and a first and a second frequency discriminator respectively centered on frequencies $F_o$ and $F'_o$ and respectively coupled to said first and second output of said switching means.

References Cited

FOREIGN PATENTS 1,338,876 8/1963 France.
1,370,141 7/1964 France.

RICHARD MURRAY, Primary Examiner

J. MARTIN, Assistant Examiner

U.S. Cl. X.R.

178—5.4